United States Patent
Dunn

(10) Patent No.: US 7,126,780 B2
(45) Date of Patent: Oct. 24, 2006

(54) METHOD, SYSTEM, AND ARTICLE OF MANUFACTURE FOR SELF-SERVOWRITING A DISK

(75) Inventor: George Anthony Dunn, San Jose, CA (US)

(73) Assignee: Hitachi Global Storage Technologies Netherlands B.V.(NL)

( * ) Notice: Subject to any disclaimer, the term of this patent is extended or adjusted under 35 U.S.C. 154(b) by 481 days.

(21) Appl. No.: 10/120,066

(22) Filed: Apr. 9, 2002

(65) Prior Publication Data

US 2003/0189781 A1 Oct. 9, 2003

(51) Int. Cl.
G11B 21/02 (2006.01)
G11B 5/596 (2006.01)

(52) U.S. Cl. .................. 360/75; 360/77.05; 360/78.05

(58) Field of Classification Search ................ 360/75, 360/51, 61, 62, 63, 31, 77.11
See application file for complete search history.

(56) References Cited

U.S. PATENT DOCUMENTS

| | | | | |
|---|---|---|---|---|
| 4,490,756 A * | 12/1984 | Dost et al. ............... | 360/77.11 |
| 5,091,808 A | 2/1992 | Nigam ..................... | 360/78.05 |
| 5,270,886 A | 12/1993 | Nigam ..................... | 360/78.05 |
| 5,615,058 A | 3/1997 | Chainer et al. ............. | 360/51 |
| 5,844,742 A | 12/1998 | Yarmchuk et al. ............ | 360/75 |
| 5,875,064 A | 2/1999 | Chainer et al. ............. | 360/75 |
| 5,907,447 A | 5/1999 | Yarmchuk et al. ............ | 360/75 |
| 6,040,955 A | 3/2000 | Brown et al. .............. | 360/75 |
| 6,049,442 A | 4/2000 | Fukushima et al. ......... | 360/77.08 |
| 6,064,550 A | 5/2000 | Koganezawa ............... | 360/106 |
| 6,215,606 B1 | 4/2001 | Chainer et al. .............. | 360/31 |
| 6,429,994 B1 * | 8/2002 | Le et al. ................... | 360/77.02 |
| 2002/0135927 A1 * | 9/2002 | Yatsu ....................... | 360/75 |
| 2002/0149867 A1 * | 10/2002 | Dunn et al. ................. | 360/51 |
| 2004/0125488 A1 * | 7/2004 | Zhu et al. ................... | 360/75 |

FOREIGN PATENT DOCUMENTS

| | | |
|---|---|---|
| JP | 04360080 | 12/1992 |
| JP | 07254245 | 10/1995 |
| JP | 9213034 | 8/1997 |
| JP | 09231538 | 9/1997 |
| JP | 10134533 | 5/1998 |
| JP | 126426 | 5/2001 |

OTHER PUBLICATIONS

Alternate partial machine translation of JP-126426 sections [0061] and [0062], Aug. 2001, pp. 1-2.
STMicroelectronics, "STMicroelectronics to present MEMS microactuator for dual servo disk drives at Diskcon 2001", [online], 2001, pp. 1-2. [Retrieved on Apr. 8, 2002]. Retrieved from the Internet at <URL: http://www.st.com/stonline/press/news/year2001/t1065d.htm>.

* cited by examiner

*Primary Examiner*—Andrew L. Sniezek
(74) *Attorney, Agent, or Firm*—Rabindranath Dutta; Konrad Raynes & Victor LLP

(57) ABSTRACT

A compound actuator self-servo writes a hard disk. The compound actuator moves to track n+1. A first head on the compound actuator track follows on track n. The other heads servo write on track n+2. One of the other heads track follow on track n. The first head servo writes track n+2. The value of n is incremented by one, and the process repeats until the entire hard disk is servo written.

38 Claims, 10 Drawing Sheets

FIG. 3
(Prior Art)
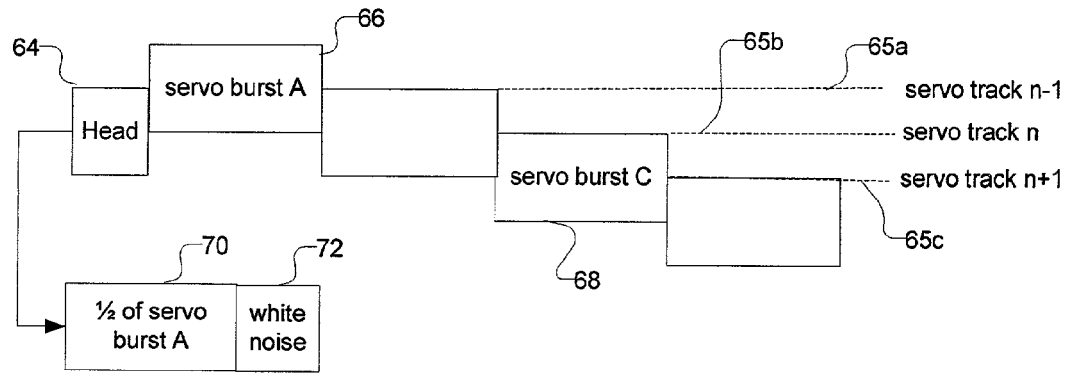
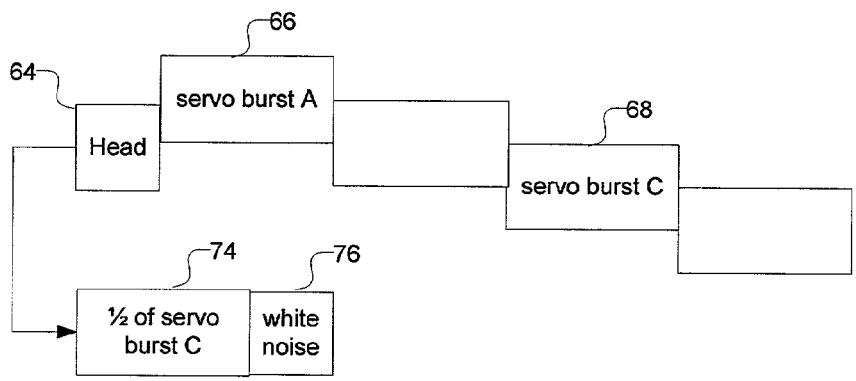
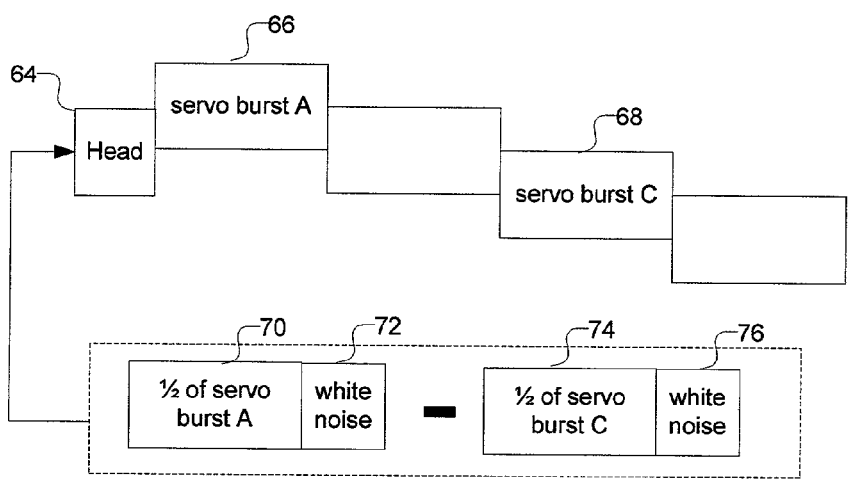

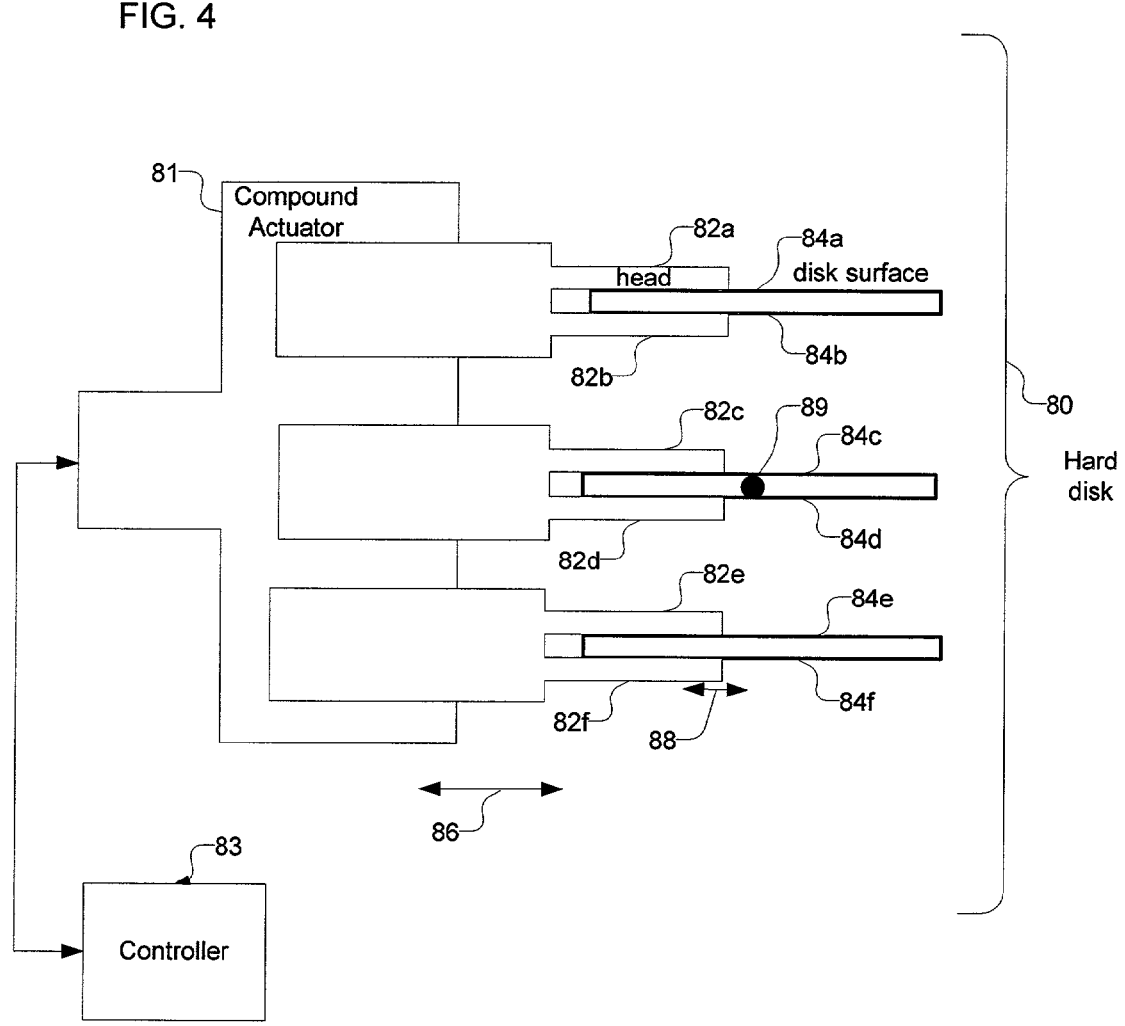

METHOD, SYSTEM, AND ARTICLE OF MANUFACTURE FOR SELF-SERVOWRITING A DISK

BACKGROUND OF THE INVENTION

1. Field of the Invention

The present invention relates to a method, system, and article of manufacture for self-servowriting a disk.

2. Description of the Related Art

Disk drive units with stacked, platter-shaped rigid magnetic disks are used for data storage. The platter-shaped disks rotate about a drive axis. A disk drive unit uses actuators to position a plurality of transducer heads, such as drive heads, that move radially to the drive axis to write data to the surfaces of the disks and read data from the surfaces of the disks. Disks store data in concentric tracks and, in the current art, the density of the tracks may exceed 100,000 tracks per inch.

To read and write data, a magnetic head must remain accurately centered on a selected track. At high track densities, the head may have to stay centered on the narrow tracks to within a tolerance better than a millionth of an inch. To achieve this level of precision, the head reads position information from tracks permanently written onto a disk surface. The position information is written in special codes called servo codes. A linear feedback system continually uses the position information (servo codes) to adjust the head to correct for position errors.

In prior art, during manufacture of the disk, a servowriter unit writes the servo codes on a disk, and the position information remains on the disk for the life of the disk. The servowriter is a specialized device used in the manufacture of the disk that includes a large base to minimize the effects of vibration, precision fixtures to hold the target disk drive, and a precision laser interferometer based actuator arm positioning mechanism to precisely position the arms radially with respect to the axis of rotation of the disks in the drive. With high servo track densities, the mechanical vibrations of the disk relative to the external sensors can affect the accuracy of the servo writer systems. In addition, a clean room environment is required by servo writer systems. Furthermore, servo writer systems are difficult to use to write servo codes on small disk drives.

Instead of using a servo writing system, self-servo writing techniques may be used. In self-servo writing, the disk head writes servo patterns as well as reads servo patterns. The servo codes have to be written with a high degree of accuracy in self-servo writing in high-density disk drivers.

FIG. 1 illustrates a schematic diagram of servo tracks on a disk during self-servo writing in a manner known in the prior art. In prior art, a head 20 can read and write servo bursts A, B, C, D (reference numerals 22, 24, 26, 28 respectively) on the disk. The servo bursts may be any pattern, whose signal amplitude can be read by the head 20. The servo bursts are of the same width as the width of a data track. The centerlines of the servo bursts form servo tracks on a disk. Since, each servo burst pattern is offset a half servo track width from the previous servo burst pattern, there are twice as many servo tracks as data tracks on a disk. To write the servo bursts, the head 20 would first write servo burst A 22. After writing servo burst A 22, the head 20 moves to a position where the head reads half of the servo burst A 22, and nothing (i.e., the blank disk). The data read by the head 20 is expressed as a combination of the amplitude of half of servo burst A 30 (obtained by reading half of the servo burst A 22) and white noise 32 (obtained by reading nothing). The head writes the servo burst B 24. However, because of the white noise 32 the positioning of the head 20 may not be exactly at the half servo track offset from servo burst A 22 while writing servo burst B 24. Head 20 writes servo burst C 26 after moving to a position where the head 20 reads half of servo burst B 24, and nothing. Subsequently, head 20 writes servo burst D 28 after moving to a position where the head 20 reads half of servo burst C and nothing.

The head 20 can self-servo write an entire disk surface. The head 20 starts adjacent to a crash stop on the disk surface (the crash stop is a fixed position on the disk at or around the center of the disk adjacent to which is the first servo track). The head 20 writes a servo burst on the first servo track. The head 20 then moves to a position where the head 20 reads half of the first servo track and nothing. The head 20 then writes a servo burst on the second servo track. In such a manner the head 20 writes servo tracks from servo track one through servo track n. At servo track n the head 20 moves to a new position where the head 20 reads an amplitude equal to half of the servo burst for servo track n and nothing. The head 20 writes the servo burst for servo track n+1 at the new position. In such a manner the head 20 writes servo bursts on servo tracks till the periphery of the disk. However, the servo patterns have positional errors on the disk because white noise 32 prevents the head 20 from being positioned at a half servo track width offset from the previous servo burst pattern.

FIG. 2 illustrates a prior art self-servo technique used when servo tracks are written to a disk with multiple surfaces or multiple disks. A first head 48a track follows, i.e. the first head 48a reads servo burst A 49 from a first surface 50a and positions the first head 48a such that a second head 48b, and a third head 48c can write to disk surfaces on the basis of the position of the first head 48a.

The second head 48b and a third head 48c write servo bursts B 51, 52 to second surface 48b and third surface 48c respectively, on the basis of the positioning of the first head 48a FIG. 2 shows that track following at 50% of the amplitude of the servo burst A 49 by the first head 48a is imprecise because of the presence of white noise (white noise is the signal read from the blank region of a disk surface). If no white noise or error introducing factors are present, then when the first head 48a reads 50% of the amplitude of servo burst A 49, the first head 48a would be half way across the servo burst A 49. Since on physical disk surfaces the head 48a reads white noise in addition to the amplitude of servo burst A 49, the first head 48a cannot be positioned exactly half way across the servo burst A 49. In particular, when a disk has a very high number of tracks per inch (for example, over 100,000 tracks per inch), track following is extremely difficult because the actuator movements cannot position the head 48a to the precision necessary for track following at 50%.

FIG. 3 illustrates a prior art technique for positioning the head more precisely than the prior art techniques shown in FIGS. 1 and 2. The figure shows a head 64 and the centerlines of servo track n−1 65a, servo track n 65b, and servo track n+1 65c. FIG. 3 also shows a servo burst A 66 centered on servo track (n−1) 65a, and a servo burst C 68 centered on servo track n+1 65c. The head 64 moves to a new track position over the servo burst A 66, where the head 64 reads half of servo burst A 70 and white noise 72. At the new position, the head 64 also reads half of servo burst C 74 and white noise 76. By subtracting the half of servo burst C 74 and the white noise 76 from the half of servo burst A 70 and the white noise 72, the head 64 eliminates the effect of the white noise 72 and 76, and the head 64 determines the position that is at a half servo track width offset from servo burst A more precisely when compared to FIGS. 1 and 2. In FIG. 3, the head 64 track follows more precisely when compared to situations where the effect of white noise is not eliminated. With FIG. 3, because servo bursts on servo track n−1 65a and servo track n+1 65c are known, the head 64 can be positioned with greater precision on servo track n 65b by the noise elimination technique outlined above. As a result higher track densities can be supported in a disk. Such a noise elimination technique is known in prior art.

The prior art self-servo writing techniques uses the read sensors to read servo information from the previously written tracks. The sensor is positioned on the half track boundary and by design the sensor reads half servo signal information and half no signal information, where the no signal information equates to typically white noise. Reading this white noise introduces a random positioning error into the positioning system. Increasing the tracks per inch may introduce an even greater extent of random unwanted vibration, system electrical noise, disk electrical noise, and read sensor noise, which results in degradation of the servo written information. Servo written information that is not written on the concentric track center exposes the servo track following system in the disk drive to errors and compromises data integrity. Although, the noise cancellation technique described in FIG. 3 is known in prior art, such prior art noise cancellation techniques have disadvantages. For good noise cancellation precise back and forth independent movements of heads may be necessary, and such movements have not been achieved in prior art noise cancellation techniques. These are some of the disadvantages with the prior art solutions. Hence, there is a need in the art to provide for a method, system, and article of manufacture that improves the quality of the servo written tracks.

SUMMARY OF THE PREFERRED EMBODIMENTS

Provided are a method, system, and article of manufacture for servo writing. An actuator having a first head coupled to a first disk surface and a second head coupled to a second disk surface is moved, and the first head is positioned on a first track of the first disk surface. The second head writes servo information on a second track of the second disk surface. The second head positions on a first track of the second disk surface. Servo information is written on a second track of the first disk surface, wherein the first and second tracks are any tracks on the first and second disk surfaces.

In another implementation, provided are a method, system, and article of manufacture for writing a plurality of tracks in a self-servo writing system. A compound actuator having a first and a second head moves to an initial track and positions the first head on a previous track of a first disk surface. The second head writes a next track of a second disk surface. The second head positions on the previous track of the second disk surface. The first head writes the next track on the first disk surface.

In further implementations, positioning the second head on the previous track of the second disk surface further comprises moving the second head to a position on the second disk surface wherein a white noise is eliminated between an amplitude of a track previous to the previous track of the second disk surface and an amplitude of the initial track of the second disk surface.

In additional implementations, the first disk surface and the second disk surface are members of a plurality of disk surfaces, wherein the plurality of tracks are arranged concentrically on each disk surface with each track having an index, wherein the index ranges from one through a total number of the plurality of tracks on each disk surface, wherein the number of tracks on each disk surface is identical, and wherein the track having the index of one is located nearest to the center of a disk surface adjacent to a crash stop. In one implementation, the index of the initial track, the previous track, and next track are repetitively incremented by one and following each incrementing, the compound actuator is moved, the first head is positioned, the next track of the second disk surface written, the second head positioned, and the next track on the first disk surface written, until all tracks are servowritten.

In another implementation, the self-servowriting system comprises additional heads wherein any of the additional heads may be used for track following, wherein the track following comprises positioning one head of the additional heads, and based on the track following writing servo tracks with heads other than the one head.

The implementations allow a track following head to track follow between two already written tracks by noise elimination between the two already written tracks. As a result, the accuracy of writing the servo tracks is improved.

BRIEF DESCRIPTION OF THE DRAWINGS

Referring now to the drawings in which like reference numbers represent corresponding parts throughout:

FIG. 3 illustrates a block diagram of a prior art noise cancellation technique for self-servowriting;

FIG. 4 illustrates a block diagram of a compound actuator in accordance with certain described implementations of the invention;

DETAILED DESCRIPTION OF THE PREFERRED EMBODIMENTS

Figure 1:
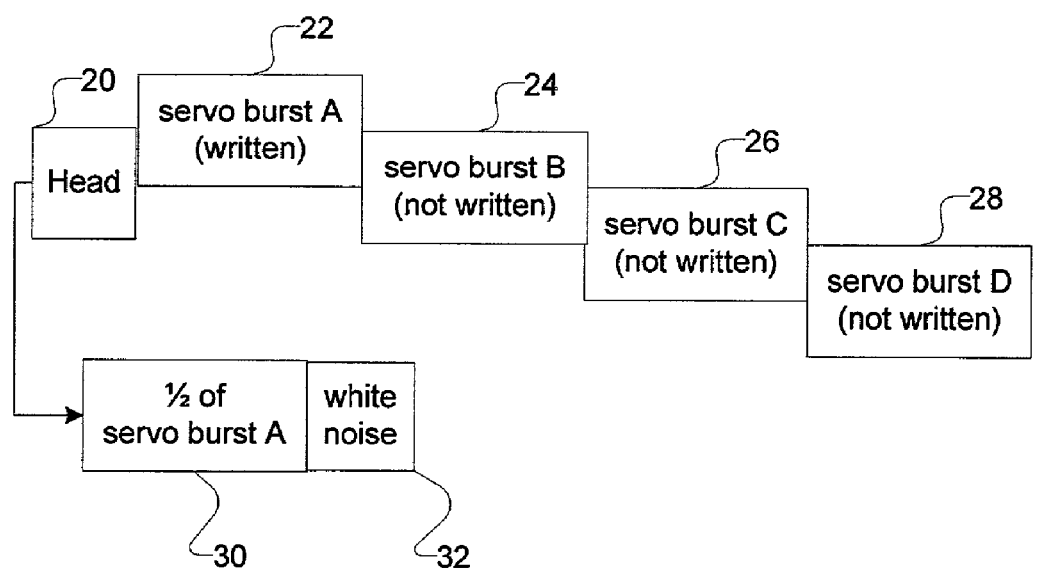
FIG. 1 illustrates a block diagram of prior art servo burst patterns written on a disk surface.

In the following description, reference is made to the accompanying drawings which form a part hereof and which illustrate several implementations. It is understood that other implementations may be utilized and structural and operational changes may be made without departing from the scope of the present implementations.

FIG. 4 illustrates a schematic diagram of a hard disk 80 containing a compound actuator 81. Unlike single stage actuators where all heads move to the same track with the actuator, a compound actuator enables each of the heads to move by a few tracks independently of the position of the actuator. For example, if a compound actuator is on servo track 100, a first head may move to servo track 99, a second head to servo track 101, and a third head may stay on servo track 100. A rotary actuator with a milli actuator on the head suspension is an example of a compound actuator. A compound actuator can of course move across the entire disk surface, potentially moving across thousands of tracks in one movement. Compound actuators can position the heads more precisely than a single stage actuator because of the independent head movements.

The compound actuator 81 has a plurality of heads 82a ... 82f. A controller 83 controls the movement of the compound actuator 81 and the plurality of heads 82a ... 82f. The controller 83 may comprise hardware or software and may be part of or be external to the hard disk 80. The hard disk 80 has a plurality of disk surfaces 84a ... 84f. Each head 82a ... 82f reads and writes to a disk surface 84a ... 84f, respectively. Although, only six heads and six disk surfaces are shown in FIG. 4, the hard disk 80 may have a different number of disk surfaces and heads, for example there may be seven heads and seven disk surfaces. The compound actuator 81 moves (reference numeral 86 exhibits the actuator movement) radially across the disk surfaces 84a ... 84f and may rigidly move the heads 82a ... 82f on the disk surfaces 84a ... 84f, respectively. Independent of the actuator movement 86, each of the heads 82a ... 82f can move (reference numeral 88 exhibits an exemplary independent head movement) a few tracks radially across the disk surface. The hard disk 80 has a crash stop 89 at the innermost diameter of each of the disk surfaces 84a ... 84f. In some implementations, there maybe a crash stop at the outermost diameter of the disk surfaces 84a ... 84f. In some implementations, the heads 82a ... 82f can write servo tracks on the disk surfaces 84a ... 84f starting from the precisely known position of the innermost crash stop 89. Other implementations may use the crash stop at the outermost diameter of the disk surfaces 84a ... 84f.

However, even in compound actuators, the same voltage when applied to two heads may cause slightly different movements on the two heads. In contrast, if one head called the track following head is precisely positioned and the other heads moved relative to the track following head, then the other heads can self-servo write more precisely.

Figure 5A:
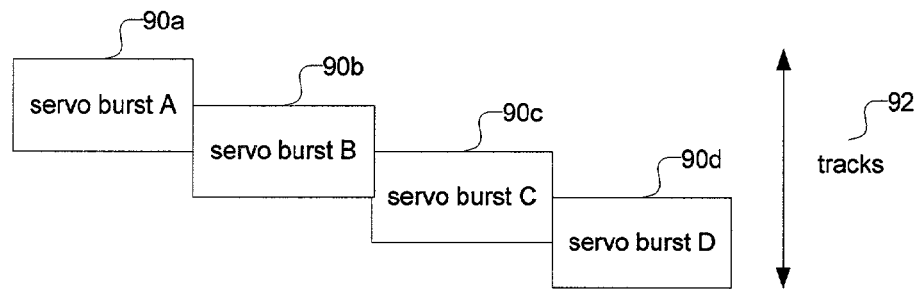
FIGS. 5a and 5b illustrate servo burst patterns in accordance with certain described implementations of the invention.

FIG. 5a illustrates a schematic diagram, in accordance with implementations of the invention, of four servo burst patterns A, B, C and D (reference numerals 90a, 90b, 90c, and 90d respectively) written across the servo tracks 92 of the disk 80, having the compound actuator 81, disk heads 82a ... 82f, and disk surfaces 84a ... 84f Each servo burst pattern 90a, 90b, 90c, and 90d is half a data track in width.

Figure 5B:
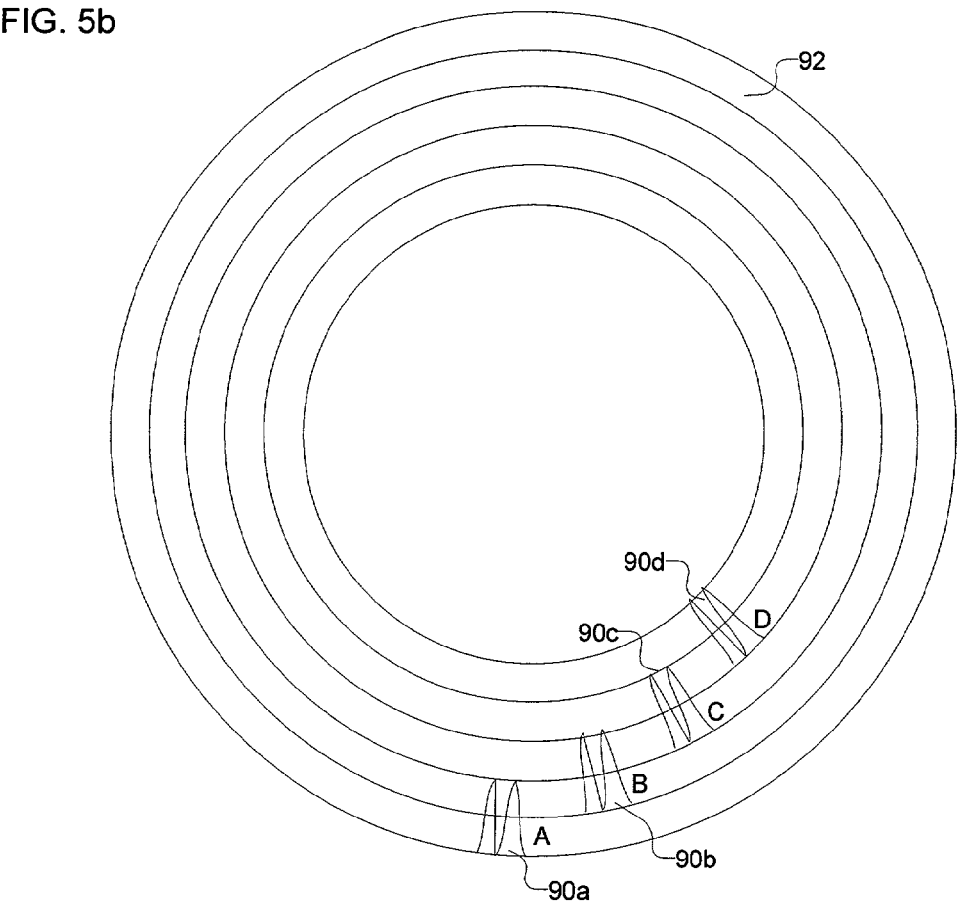

FIG. 5b illustrates a schematic diagram, in accordance with implementations of the invention, of the four servo burst patterns 90a ... 90d as written with respect to the entire disk surface 84a ... 84f and the servo tracks 92 in a top view. Each servo track shown in the servo tracks 92 has an index, where the index ranges from one through the total number of servo tracks on each disk surface, where the number of tracks on each disk surface is identical. In this case, the track having the index of one is located nearest to the center of a disk surface adjacent to the crash stop 89.

Figure 6A:
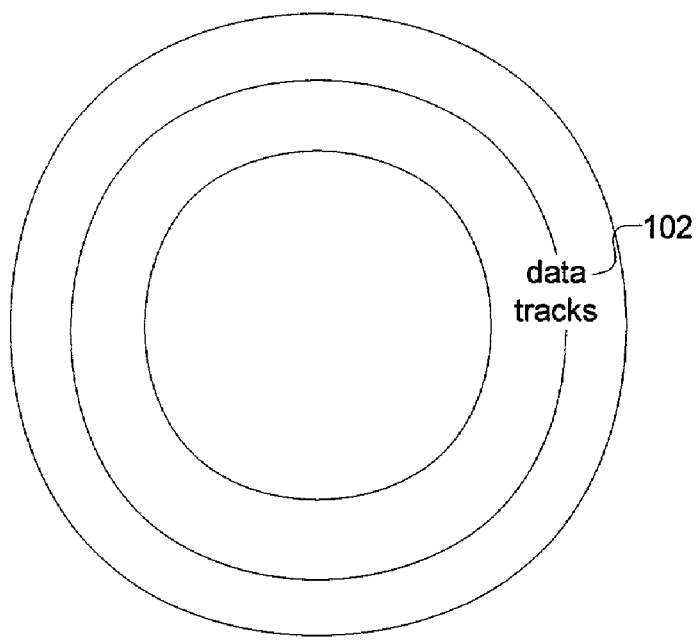
FIGS. 6a and 6b illustrate data tracks and servo tracks in accordance with certain described implementations of the invention.

FIG. 6a shows a collection of data tracks 102 on the disk surface 84a ... 84f. Applications can write data onto the data tracks 102. The data tracks 102 are concentric around the center of the disk surface 84a ... 84f.

Figure 6B:
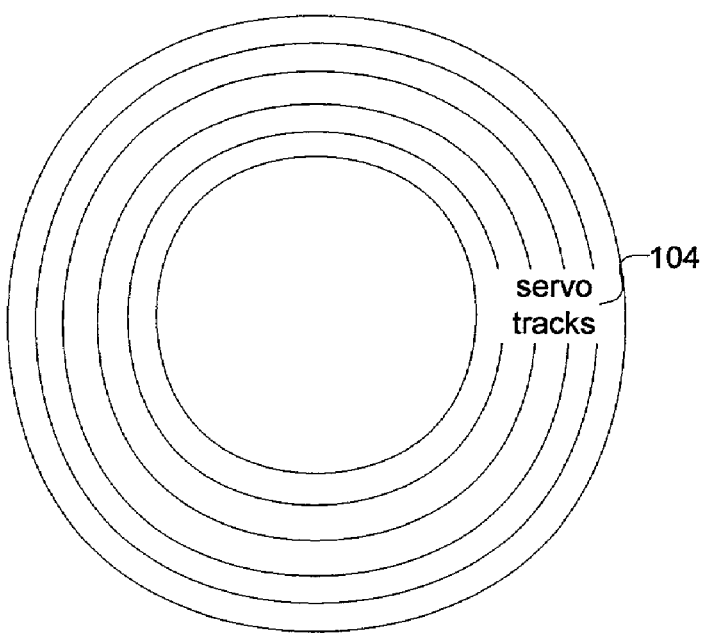

FIG. 6b shows a collection of servo tracks 104 on the disk surface 84a ... 84f. The compound actuator 81 writes servo bursts 90a ... 90d on the servo tracks 104 before any data is written on the data tracks 102. Each servo burst pattern 90a ... 90d is the width of a data track 102. However because adjacent servo burst patterns 90a, 90b, 90c, and 90d overlap each other by half the width of a servo (or data) track, there are twice as many servo tracks 104 on a disk surface 84a ... 84f as there are data tracks 102.

Figure 7:
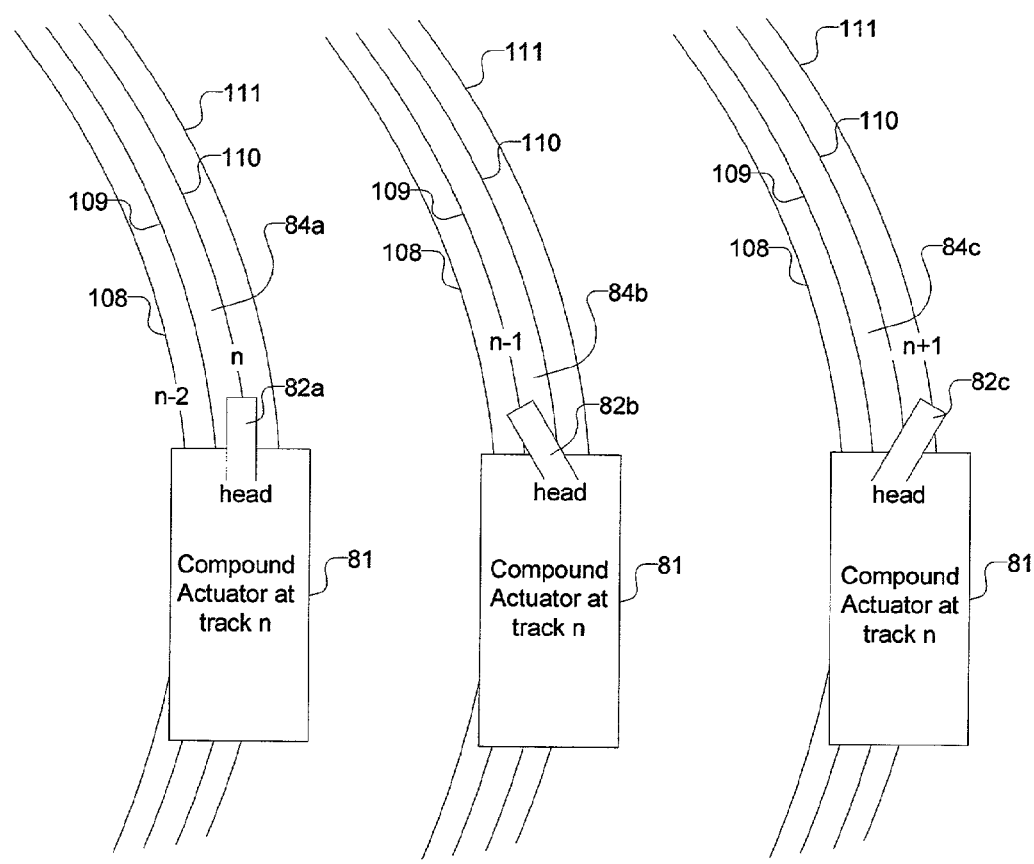
FIG. 7 illustrates the operation of a compound actuator in accordance with certain described implementations of the invention.

FIG. 7 shows compound actuator 81 with head 82a on disk surface 84a, head 82b on disk surface 84b, and head 82c on disk surface 84c. Only four servo tracks 108, 109, 110, and 111 are shown on each disk surface 84a, 84b, and 84c. The number of servo tracks can vary from 1 to the highest track number on the disk surfaces 84a, 84b, 84c. Servo track 110 corresponds to servo track n, and servo tracks 111, 109, 108 correspond to servo tracks n+1, n−1, n−2 respectively. The number n can vary from 1 to the highest number of servo tracks.

In FIG. 7, the position of the compound actuator 81 and heads 82a–82c are shown in accordance with one embodiment of the present invention. In this configuration, the compound actuator 81 is positioned on servo track n 110. Head 82a is on the same servo track n 110 as the compound actuator 81. However, head 82b is one servo track behind on servo track n−1 109, and head 82c is one servo track ahead on servo track n+1 111. Each head 82a, 82b, 82c can move at least one servo track ahead and at least one servo track behind the actuator servo track position in a manner known in the art. Thus, the heads 82a, 82b, and 82c can move independently on the compound actuator.

Figure 8:
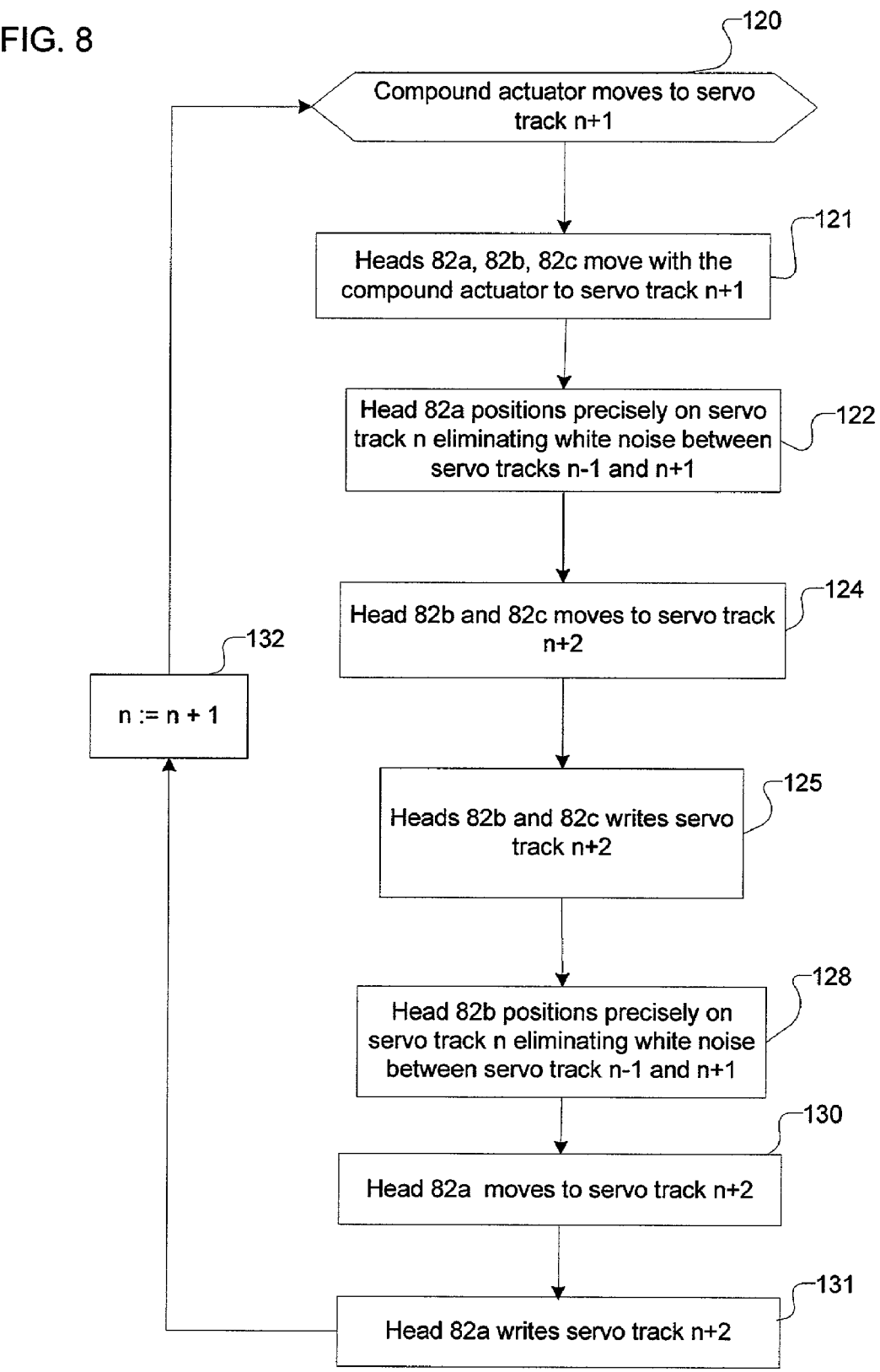
FIG. 8 illustrates logic implemented in a compound actuator for self-servowriting in accordance with certain described implementations of the invention.

FIG. 8 illustrates logic implemented in a controller of a self-servo writing system for writing self-servo bursts on the disk surfaces 84a, ... c in accordance with the present invention. While the implementation has three disk surfaces, the logic applies to the hard disk 80 with two or more disk surfaces. In one implementation, the self-servowriting system begins the self-servowriting process by moving the compound actuator 81 along with all three heads 82a, 82b, and 82c to rest against the crash stop 89 (since the heads are resting against the crash stop 89 the heads are positioned for writing very precisely) at the center of the hard disk 80, and each head 82a, 82b, 82c servo writes servo burst B 90b on servo track 2. The self-servowriting system assigns track 2 to n. Heads 82a, 82b, 82c then move to servo track 1, i.e n−1, and heads 82a, 82b, 82c write servo burst A 90a. Heads 82a, 82b, 82c then move to servo track 3, i.e n+1, and heads 82a, 82b, 82c, 82d write servo burst C 90c.

In alternative implementations, the heads 82a, 82b, 82c may exhibit independent movements of more than one track on either side of the position of the compound actuator 81. For example, the heads 82a, 82b, 82c may move up to two tracks ahead of the position of the compound actuator 81 and two tracks behind the position of the compound actuator 81. In some implementations the self-servowriting system may assign a track other than track 2 to n. For example, the self-servowriting system may assign track 3 to n, and the heads 82a, 82b, 82c may then move to any of the tracks from 1 to 5.

At block 120, the compound actuator 81 moves to servo track n+1. Servo tracks n−1, n, and n+1 have already been written. The heads 82a, 82b, 82c move (at block 121) with the compound actuator 81 to servo track n+1. At block 122, head 82a moves and positions precisely on servo track n. Track following is achieved using the servo bursts written on servo tracks n−1, n, and n+1. For precise positioning of head 82a on servo track n, white noise is eliminated by subtracting the burst information written on tracks n−1 and n+1 as described in FIG. 3.

With head 82a positioning precisely and track following (at block 122) on servo track n, heads 82b, 82c move (at block 124) to servo track n+2 and servo write (at block 125) track n+2. Head 82b then moves (at block 128) independently to servo track n and positions precisely and track follows on track n. For precise positioning of head 82b on servo track n, white noise is eliminated by subtracting the burst information written on tracks n−1 and n+1 as described in FIG. 3. Head 82a then moves (at block 130) to track n+2 and servo writes (at block 131) track n+2.

At the conclusion of block 131, control proceeds to block 132 where n is incremented by one and the blocks 120 to 131 are repeated over and over until all servo tracks on all disk surfaces 84a, 84b, 84c are written with servo burst patterns 90a . . . 90d from servo track 1 to the highest number of servo tracks.

Figure 9:
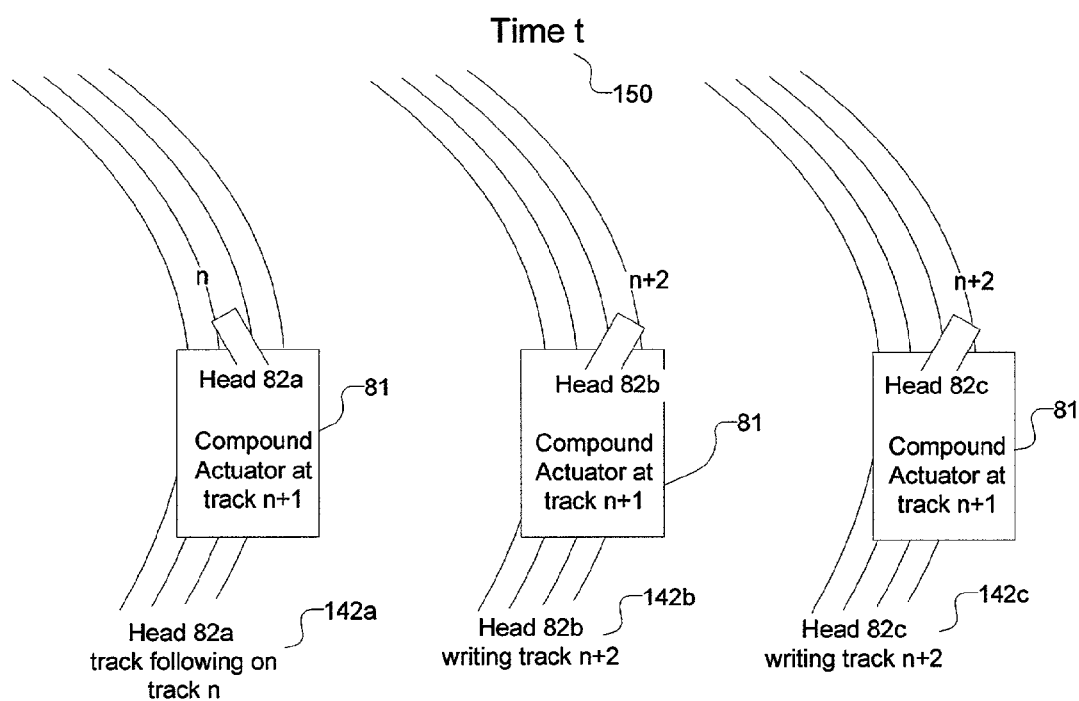
FIGS. 9 and 10 illustrates blocks diagrams indicating the positions of the heads during self-servowriting in accordance with certain described implementations of the invention.

In FIG. 9, the compound actuator 81 and head positions 142a, 142b, and 142c are shown at time t 150 corresponding to block 124 in FIG. 8. In FIG. 9 head 82a is one track behind the position of the compound actuator 81 and heads 82b and 82c are one track ahead of the compound actuator 81. Head 82a is track following precisely on track n using previously written servo track burst information 90a, 90b, 90c, and 90d to keep on track and cancel out white noise as described in FIG. 3.

Figure 10:
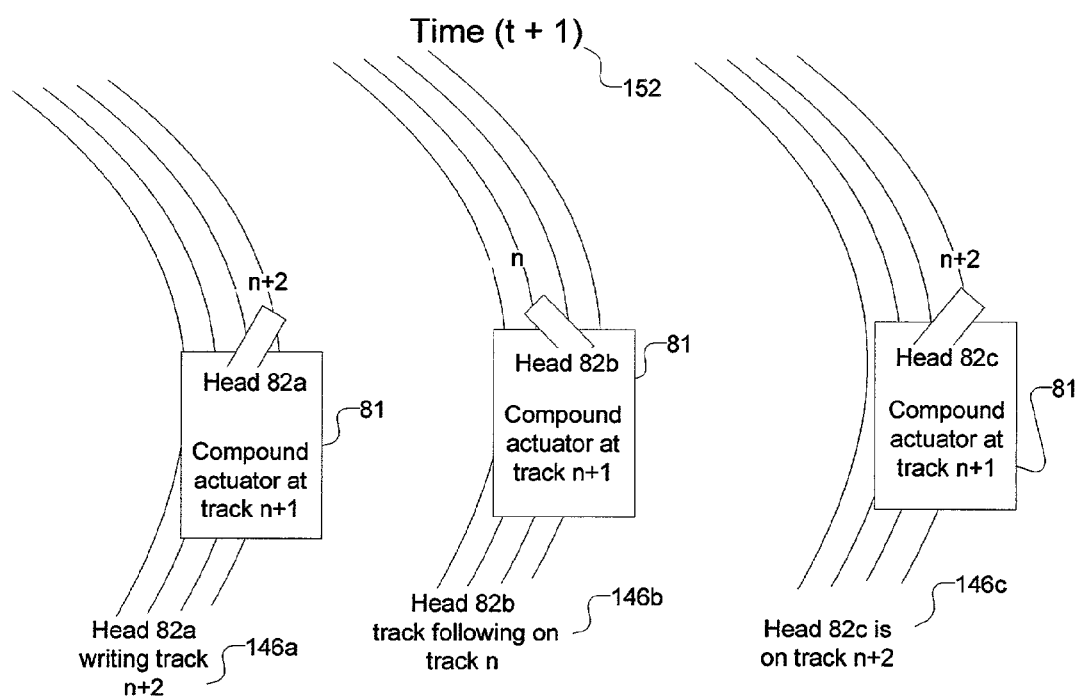

FIG. 10 shows the compound actuator 81 and head positions 146a, 146b, and 146c at time t+1 152, where t+1 152 is a time that is subsequent to time t 150. FIG. 10 corresponds to block 130 in FIG. 8. In FIG. 10, head 82b is one track behind the position of the compound actuator 81 and head 82a and 82c are one track ahead of the compound actuator 81. Head 82b now takes over the track following task on track n allowing head 82a to write servo track n+2.

In an alternative implementation of the logic shown in FIG. 8, at block 128, instead of using head 82b moving to servo track n, head 82c could be moved to servo track n and in block 128 head 82c could have been the track follow head instead of head 82b.

While the implementation described in FIG. 8 has been shown with three heads, the logic could be applied with only two heads. In such a case, a first head would be the track following head and the second head would write servo tracks. Subsequently, the second head would be the track following head, and the first head would write servo tracks.

Figure 2:
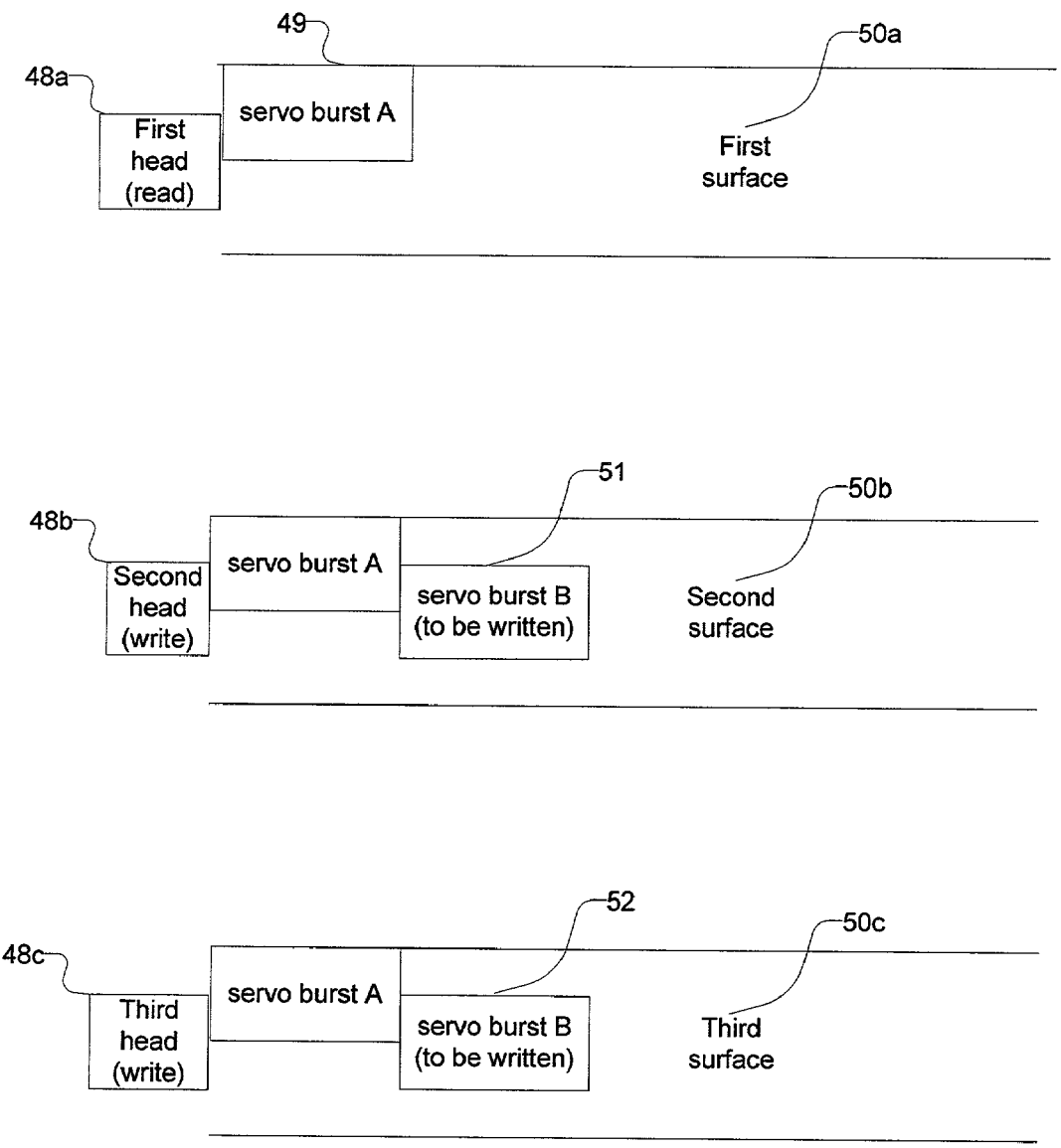
FIG. 2 illustrates a block diagram of prior art servo burst patterns written on multiple disk surfaces by a single stage actuator.

With the compound actuator 81, there is no need for track following on single burst half track (track following on single burst half track was shown on the first surface 50a of FIG. 2) as was the case in prior art. The heads of the compound actuator 81 write self-servo patterns more precisely when compared to the situation where the heads cannot move independently of an actuator. The described implementations improve accuracy because earlier written servo bursts are used for noise elimination while positioning a track following head, and based on the positioning of the track following head the other heads write servo tracks.

The implementations allow the track following head to track follow between two already written servo tracks. The result is a much more precise series of servo tracks because the self-servo write process can compensate for any deviation from servo track center. Higher servo write rotational speeds can also be used for servo-writing. Furthermore, compound actuator based self-servo writes do not require an expensive pusher-based servowriting equipment.

Additional Implementation Details

The described self-servo writing techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

The logic of FIG. 8 described specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments.

There are several ways of arranging servo information. In the "wedge servo" implementation, the servo information is recorded in a wedge of each platter-shaped disk. In "embedded servo," servo information is interspersed with data across the entire surface of all the hard disk platter surfaces. The implementations described can be adapted for either "wedge servo" or "embedded servo" methods of arranging servo information, or any other arrangement of servo data known in the art.

In the described implementations, the servo track width is the same as the data track width, and adjacent servo tracks are offset by half a track width. Variations of the implementation where the servo track width is different from the data track width, and where the offset between adjacent servo tracks is different from half a track width are possible. For example, implementations where adjacent servo tracks overlap each other by a third of a track width, or do not overlap at all are possible.

In the described implementations, each head moves one servo track ahead and one servo track behind an actuator track position. Alternative implementations where the heads move a different number of servo tracks ahead and behind the actuator track position are possible.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for writing a plurality of tracks in a self-servowriting system, the method comprising:
    moving a compound actuator having a first and a second bead to an initial track;
    positioning the first head on a previous track with respect to the initial track on a first disk surface;
    servowriting a next track with respect to the initial track on a second disk surface with the second head;
    positioning the second head on the previous track of the second disk surface; and
    servowriting the next track on the first disk surface with the first head.

2. The method of claim 1, wherein positioning the second head on the previous track of the second disk surface further comprises:
    moving the second head to a position on the second disk surface wherein a white noise is eliminated between an amplitude of a track previous to the previous track of the second disk surface and an amplitude of the initial track of the second disk surface.

3. The method of claim 1, wherein writing the next track of the second disk surface by the second head, further comprises:
    determining a first position of the compound actuator;
    determining a second position of the first head;
    positioning the second head relative to the first position and the second position to the next track; and
    writing the next track on the second disk surface.

4. The method of claim 1, wherein writing the next track on the first disk surface with the first head, further comprises:
    determining a first position of the compound actuator;
    determining a second position of the second head;
    positioning the first head relative to the first position and the second position to the next track; and
    writing the next track on the first disk surface.

5. The method of claim 1, wherein each track is a servo track having a servo track width, wherein the servo track width is same as the width of a data track.

6. The method of claim 1, wherein each track is capable of having servo burst patterns written on the track.

7. The method of claim 1, wherein each track is a servo track, and both the first disk surface and second disk surface have twice as many servo tracks as data tracks.

8. The method of claim 1, wherein the first disk surface and the second disk surface are members of a plurality of disk surfaces, wherein the plurality of tracks are arranged concentrically on each disk surface.

9. The method of claim 8, further comprising, repetitively:
    (I) incrementing the initial track, the previous tack, and next track by one; and
    (ii) following each incrementing, moving the compound actuator; positioning the first head, writing the next track of the second disk surface; and positioning the second head, and writing the next track on the first disk surface;
until all tracks are servowritten.

10. The method of claim 1, wherein the compound actuator has a third head, further comprising:
    subsequent to positioning the first head on the previous track of the first disk surface;
    writing a next track of a third disk surface with the third head; and
    subsequent to writing the next track of the third disk surface with the third head and prior to writing the next track on the first disk surface with the first head, positioning the third head on a previous track of the third disk surface.

11. The method of claim 1, wherein the self-servowriting system comprises additional heads wherein any of the additional heads may be used for track following, wherein the track following comprises positioning one head of the additional heads, and based on the track following writing servo tracks with heads other than the one head.

12. The method of claim 1, wherein positioning the second head on the previous track of the second disk surface further comprises:
    moving the second head to a position an the second disk surface to eliminate white noise.

13. The method of claim 1, wherein a plurality of tracks are arranged concentrically on each disk surface.

14. A system for writing plurality of tracks in a self-servowriting system, the system comprising:
    an actuator having a first head and a second head;
    means for moving the actuator to an initial track;
    means for positioning the first head on a previous track of a first disk surface;
    means for writing a next track of a second disk surface with the second head;
    means for positioning the second bead on the previous track of the second disk surface, wherein the means for positioning the second head on the previous track of the second disk surface further performs moving the second head to a position on the second disk surface wherein a white noise is eliminated between an amplitude of a track previous to the previous track of the second disk surface and an amplitude of the initial track of the second disk surface; and
    means for writing the next track on the first disk surface with the first head.

15. The system of claim 14, wherein each track is a servo track having a servo track width, wherein the servo track width is same as the width of a data track.

16. The system of claim 14, wherein each track is capable of having servo burst patterns written on the track.

17. The system of claim 14, wherein each track is a servo track, and both the first disk surface and second disk surface have twice as many servo tacks as data tracks.

18. The system of claim 14, wherein the first disk surface and the second disk surface are members of a plurality of disk surfaces, wherein the plurality of tracks are arranged concentrically on each disk surface.

19. The system of claim 18, further comprising means for repetitively performing:
    (i) incrementing the initial track, the previous track, end next track by one; and
    (ii) following each incrementing, moving the actuator, positioning the first head, writing the next track of the second disk surface, positioning the second head, and writing the next track on the first disk surface;
until all tracks are servowritten.

20. The system of claim 14, wherein the actuator has a third head, further comprising:
   means for writing a next track of a third disk surface with the third head, subsequent to positioning the first head on the previous track of the first disk surface; and
   means for positioning the third head on a previous track of the third disk surface, subsequent to writing the next track of the third disk surface with the third bead and prior to writing the next track on the first disk surface with the first head.

21. The system of claim 14, wherein the self-servowriting system comprises additional heads wherein any of the additional heads may be used for track following, wherein the track following comprises positioning one head of the additional heads, and based on the track following wilting servo tracks with heads other than the one head.

22. A system for writing a plurality of tracks in a self-servowriting system, the system comprising:
   an actuator having a first head and a second head;
   means for moving the actuator to initial track;
   means for positioning the first head on a previous track of a first disk surface;
   means for writing a next track of a second disk surface with the second head;
   means for positioning the second head on the previous track of the second disk surface; and
   means for writing the next track on the first disk surface with the first head, wherein the means for writing the next track of the second disk surface by the second head, further performs:
   (I) determining a first position of the actuator;
   (ii) determining a second position of the first head;
   (iii) positioning the second head relative to the first position and the second position to the next track; and
   (iv) writing the next track on the second disk surface.

23. The system of claim 22, wherein the means for positioning the second head on the previous track of the second disk surface further performs:
   moving the second head to a position on the second disk surface to eliminate white noise.

24. The system of claim 22, wherein a plurality of tracks are arranged concentrically on each disk surface.

25. A system for writing a plurality of tracks in a self-servowriting system, the system comprising:
   an actuator having a first head and a second head;
   means for moving the actuator to an initial track;
   means for positioning the first head on a previous track of a first disk surface;
   means for writing a next track of a second disk surface with the second head;
   means for positioning the second head on the previous track of the second disk surface; and
   means for writing the next track on the first disk surface with the first head, wherein the means for writing the next truck on the first disk surface with the first head, further performs:
   (I) determining a first position of the actuator;
   (ii) determining a second position of the second head;
   (iii) positioning the first head relative to the first position and the second position to the next tack; and
   (iv) writing the next track on the first disk surface.

26. An article of manufacture for writing a plurality of tracks in a self-servowriting system, wherein the article of manufacture causes operations, the operations comprising:
   moving a compound actuator having a first and a second head to an initial track;
   positioning the first head on a previous track of a first disk surface;
   writing a next track of a second disk surface with the second head;
   positioning the second bead on the previous track of the second disk surface; and
   writing the next track on the first disk surface with the first head.

27. The article of manufacture of claim 26, wherein positioning the second head on the previous track of the second disk surface further comprises:
   moving the second head to a position on the second disk surface wherein a white noise is eliminated between an amplitude of a track previous to the previous track of the second disk surface and an amplitude of the initial track of the second disk surface.

28. The article of manufacture of claim 26, wherein writing the next track of the second disk surface by the second head, further comprises:
   determining a first position of the compound actuator;
   determining a second position of the first head;
   positioning the second head relative to the first position and the second position to the next track; and
   writing the next track on the second disk surface.

29. The article of manufacture of claim 26, wherein writing the next track on the first disk surface wit the first head, further comprises:
   determining a first position of the compound actuator,
   determining a second position of the second head;
   positioning the first head relative to the first position and the second position to the next track; and
   writing the next track on the first disk surface.

30. The article of manufacture of claim 26, wherein each track is a servo track having a servo track width, wherein the servo truck width is same as the width of a data track.

31. The article of manufacture of claim 26, wherein each track is capable of having servo burst patterns written on the track.

32. The article of manufacture of claim 26, wherein each track is a servo track, and both the first disk surface and second disk surface have twice as many servo tracks as data tracks.

33. The article of manufacture of claim 26, wherein the first disk surface and the second disk surface are members of a plurality of disk surfaces, wherein the plurality of tracks are arranged concentrically on each disk surface.

34. The article of manufacture of claim 33, the operations further comprising,
   repetitively:
   (i) incrementing the initial track, the previous track, and next track by one; and
   (ii) following each incrementing, moving the compound actuator, positioning the first head, writing the next track of the second disk surface, positioning the second head, and writing the next track on the first disk surface;
   until all tracks are servowritten.

35. The article of manufacture of claim 26, wherein the compound actuator has a third head, the operations further comprising;
   subsequent to positioning the first head on the previous track of the first disk surface,
   writing a next track of a third disk surface with the third head;
   subsequent to writing the next track of the third disk surface with the third head and prior to writing the next track on the first disk surface with the first bead, positioning the third head on a previous track of the third disk surface.

36. The article of manufacture of claim 26, wherein the self-servowriting system comprises additional heads wherein any of the additional heads may be used for track following, wherein the track following comprises positioning one head of the additional heads, and based on the track following writing servo tracks with heads other than the one head.

37. The article of manufacture of claim 26, wherein positioning the second head on the previous track of the second disk surface further comprises:
    moving the second head to a position on the second disk surface to eliminate white noise.

38. The article of manufacture of claim 26, wherein a plurality of tracks are arranged concentrically on each disk surface.

* * * * *